United States Patent
Vanderheyden et al.

(10) Patent No.: US 12,443,844 B2
(45) Date of Patent: Oct. 14, 2025

(54) NEURAL NETWORK TRAINED USING ORDINAL LOSS FUNCTION

(71) Applicant: INTERNATIONAL BUSINESS MACHINES CORPORATION, Armonk, NY (US)

(72) Inventors: Robert Vanderheyden, Acworth, GA (US); William Chamberlin, Palatine, IL (US); John Handy Bosma, Leander, TX (US)

(73) Assignee: International Business Machines Corporation, Armonk, NY (US)

( * ) Notice: Subject to any disclaimer, the term of this patent is extended or adjusted under 35 U.S.C. 154(b) by 991 days.

(21) Appl. No.: 17/509,840

(22) Filed: Oct. 25, 2021

(65) Prior Publication Data

US 2023/0132127 A1    Apr. 27, 2023

(51) Int. Cl.
| | |
|---|---|
| *G06N 3/08* | (2023.01) |
| *G06F 18/2113* | (2023.01) |
| *G06F 18/2137* | (2023.01) |
| *G06F 18/22* | (2023.01) |
| *G06F 18/2431* | (2023.01) |

(52) U.S. Cl.
CPC ......... *G06N 3/08* (2013.01); *G06F 18/2113* (2023.01); *G06F 18/2137* (2023.01); *G06F 18/22* (2023.01); *G06F 18/2431* (2023.01)

(58) Field of Classification Search
CPC ....... G06N 3/08; G06F 18/22; G06F 18/2113; G06F 18/2431; G06F 18/2137
See application file for complete search history.

(56) References Cited

U.S. PATENT DOCUMENTS

| | | | |
|---|---|---|---|
| 6,772,149 B1 | 8/2004 | Morelock et al. | |
| 10,789,363 B1 | 9/2020 | Gursoy et al. | |
| 10,832,171 B2 | 11/2020 | Mittal et al. | |
| 11,599,927 B1 * | 3/2023 | Flunkert | G06F 40/30 |

(Continued)

FOREIGN PATENT DOCUMENTS

CN    109710574 A    5/2019

OTHER PUBLICATIONS

Vanderheyden, B., "Ordinal HyperPlane Loss," Analytics and Data Science Dissertations, Kennesaw State University, Oct. 1, 2019, 164 pg.

(Continued)

*Primary Examiner* — Beau D Spratt
(74) *Attorney, Agent, or Firm* — Harrity & Harrity, LLP

(57) ABSTRACT

Training an ordinal mapping deep neural network (OMDNN) can include receiving multiple samples, each a computer-processable data structure corresponding to a real-world object and including a data element indicating one of n predefined classes to which each sample is linked. Each sample can be mapped by the OMDNN to sample points of a multidimensional space. The OMDNN can predicts the class of each sample based on an ordinal mapping. Parameters of the OMDNN can be iteratively adjusted in response to misclassifying one or more samples. Iteratively adjusting the parameters can be based on an expected loss determined by an ordinal mapping loss function that measures (a) distances between each sample point in the multidimensional space and each other sample point of the same class and (b) overlap between sample points of different classes.

20 Claims, 11 Drawing Sheets

(56) References Cited

U.S. PATENT DOCUMENTS

| | | |
|---|---|---|
| 2017/0200205 A1 | 7/2017 | Liu et al. |
| 2020/0065656 A1* | 2/2020 | Song .................. G06N 3/08 |
| 2020/0125803 A1 | 4/2020 | Jezewski |
| 2020/0265327 A1 | 8/2020 | Kwiatkowski et al. |
| 2020/0342214 A1* | 10/2020 | Li .................. G06F 18/217 |
| 2020/0356952 A1 | 11/2020 | Chan et al. |
| 2021/0024094 A1* | 1/2021 | Maat .................. G06N 3/048 |
| 2021/0034980 A1* | 2/2021 | Xia .................. G06N 3/08 |
| 2021/0103814 A1* | 4/2021 | Tsiligkaridis ............ G06N 3/08 |
| 2021/0311996 A1* | 10/2021 | Bonin .................. G06F 16/9035 |
| 2023/0040110 A1* | 2/2023 | Lu .................. G06N 3/08 |
| 2023/0122392 A1* | 4/2023 | Steiner .................. G06T 7/0012 |
| | | 345/629 |

OTHER PUBLICATIONS

Vanderheyden, B. et al., "Ordinal Hyperplane Loss," In Proceedings of 2018 IEEE International Conference on Big Data 2018.

Nayak, P., "Understanding Searches Better Than Ever Before," [online] Google, The Keyword, Oct. 25, 2019, retrieved from the Internet: <https://blog.google/products/search/search-language-understanding-bert/>, 2 pg.

Mell, P. et al., The NIST Definition of Cloud Computing, National Institute of Standards and Technology, U.S. Dept. of Commerce, Special Publication 800-145, Sep. 2011, 7 pg.

* cited by examiner

```
┌─────────────────────────────────────────────────────────────────────┐
│  Receive plurality of samples, each sample a computer-processable   │
│  data structure corresponding to a real-world object and having a   │
│  data element indicatin gthe sample's class, the class one of n     │
│  predefined classes to which each sample is linked                  │
│                              202                                    │
└─────────────────────────────────────────────────────────────────────┘
                                 │
                                 ▼
┌─────────────────────────────────────────────────────────────────────┐
│  Feed each sample into an ordinal mapping deep neural network that  │
│  maps each sample to a sample point in a multidimensional space     │
│  based on the class of each sample                                  │
│                              204                                    │
└─────────────────────────────────────────────────────────────────────┘
                                 │
                                 ▼
┌─────────────────────────────────────────────────────────────────────┐
│  Predict the class of each sample based on an ordinal mapping of    │
│  each sample point by the ordinal mapping deep neural network       │
│                              206                                    │
└─────────────────────────────────────────────────────────────────────┘
                                 │
                                 ▼
┌─────────────────────────────────────────────────────────────────────┐
│  Iteratively adjust parameters of the ordinal mapping deep neural   │
│  network in response to misclassifying one or more of the samples   │
│  by the ordinal mapping deep neural network, the iteratively        │
│  adjusting based on an expected ordinal mapping loss determined by  │
│  an ordinal mapping loss function that measures (a) distances       │
│  between a hyperplane extending through each sample point in the    │
│  multidimensional space and each other sample point of a same       │
│  class and (b) overlap between sample points of differenct classes  │
│                              208                                    │
└─────────────────────────────────────────────────────────────────────┘
```

FIG. 2

| $c_i:z_j$ | 4:6.0 | 1:3.1 | 2:5.2 | 0:1.0 | 4:4.0 | 2:2.2 | 1:3.7 |
|---|---|---|---|---|---|---|---|
| 4:6.0 | 0 | 0 | 0 | 0 | 0 | 0 | 0 |
| 1:3.1 | 0 | 0.1 | 1.2 | 0 | 0 | 0 | 0.7 |
| 2:5.2 | 0 | 0 | 0 | 0 | 0 | 0 | 0 |
| 0:1.0 | 0 | 0 | 0 | 0 | 0 | 0 | 0 |
| 4:4.0 | 0 | 2.1 | 3.2 | 1.0 | 0 | 0.2 | 2.7 |
| 2:2.2 | 0 | 1.9 | 0 | 0.8 | 0 | 0 | 2.5 |
| 1:3.7 | 0 | 0 | 0 | 0 | 0 | 0 | 0 |

| $\bar{w}' \cdot \phi(\bar{x})_i = z_i$ | $c_i$ |
|---|---|
| 6.0 | 4 |
| 3.1 | 1 |
| 5.2 | 2 |
| 1.0 | 0 |
| 4.0 | 4 |
| 2.2 | 2 |
| 3.7 | 1 |

| $c_i$:$z_j$ | 4:6.0 | 1:3.1 | 2:5.2 | 0:1.0 | 4:4.0 | 2:2.2 | 1:3.7 |
|---|---|---|---|---|---|---|---|
| 4:6.0 | 0 | 0 | 0 | 0 | 1.7 | 0 | 0 |
| 1:3.1 | 0 | 0 | 0 | 0 | 0 | 0 | 0 |
| 2:5.2 | 0 | 0 | 0 | 0 | 0 | 2.7 | 0 |
| 0:1.0 | 0 | 0 | 0 | 0 | 0 | 0 | 0 |
| 4:4.0 | 0 | 0 | 0 | 0 | 0 | 0 | 0 |
| 2:2.2 | 0 | 0 | 0 | 0 | 0 | 0 | 0 |
| 1:3.7 | 0 | 0.3 | 0 | 0 | 0 | 0 | 0 |

FIG. 4B

MD&I Verity beta

☐ Saved gems
② About
▦ Release Notes

🔍 Blockchain 2020

Options ☐ Externally Shareable    Source ˅    Timeframe ˅    Score: 4 & up ˅

Sort by  Relevancy | Recency

---

◯ IDC: European Blockchain Spending Forecast, 2019-2023                           602

It accounts for over a fifth of blockchain spending in 2020, but it is predicted to grow the fastest in the next couple of years.

☆ 4 Verity score          Aug 2020          IBM Internal          ☆ Rate this gem    ⋮

---

◯ IDC: European Blockchain Spending Forecast, 2019-2023                           604

With the increasing encroachment of blockchain services, the share of software spending will decrease slightly from 28% in 2018 to 26% by 2023, with blockchain platforms representing nearly the total of the market.

☆ 4.3 Verity score       Aug 2020          IBM Internal          ☆ Rate this gem    ⋮

FIG. 6A

Blockchain 2020

Source ⌄    Timeframe ⌄    Score: 2 & up ⌄

Sort by    Relevancy ⌄

○ IDC: European Blockchain Spending Forecast, 2019-2023

It accounts for over a fifth of blockchain spending in 2020, ; but it is predicted to grow the fastest in the next couple of years.

★ 4 Verity score    Aug 4, 2020    IBM Internal    ★ Rate this gem

○ IDC: European Blockchain Spending Forecast, 2019-2023

While 2020 year-on-year growth expectations for all industries have decreased from the previous forecast, in relation to blockchain opportunity, finance, manufacturing, and distribution in particular saw the largest speeding growth decrease for 2020 in relation to pre-COVID-19 estimates.

★ 3.1 Verity score    Aug 4, 2020    IBM Internal    ★ Rate this gem

○ 451 Research: In Asia-Pacific, IBM treads growth path with cloud, AI and...

IBM has also invested substantially in blockchain technology.

★ 2.7 Verity score    Aug 6, 2020    IBM Internal    ★ Rate this gem

○ HFS Research: HFS Top 10 Enterprise Blockchain Services 2020

The 2020 HFS Top 10 Enterprise Blockchain Services report investigates the blockchain space to provide a comprehensive and foundational analysis of the blockchain solutions and services market for enterprises.

★ 2.3 Verity score    Apr 24, 2020    IBM Internal    ★ Rate this gem

---

606

× Close    ♂ Source    ⊠ Save    ☑ Copy Citation

Source                      Verity score

European Blockchain Spending    ★ 3.1/1    ⓘ    | ★ ★ ★ ★
Forecast, 2019-2023
IDC | Aug 03, 2020 |IBM Internal     Quality rating decided by verity automated
       Europe                       scoring and user input. Add your rating to
                                               help improve the system.

EXCERPT 1 OF 1                  ALL GEMS FROM THIS DOCUMENT — 608

...with the aim of making blockchain ready for    While 2020 year-on-year growth
enterprises and creating new, transformative      expectations for all industries have
business models. The current outbreak          decreased from the previous forecast, in
negatively affected all industries at different      relation to blockchain opportunity,
levels, with some more exposed to shutdowns    finance, manufacturing, and distribution in
and reduction in demand, although some        particular saw the largest speeding growth
limited blockchain use cases could potentially     decrease for 2020 in relation to pre-
drive blockchain deployments in selected areas.   COVID-19 estimates.

← 610

While 2020 year-on-year growth           Adoption went beyond the financial sector
expectations for all industries have          to manufacturing and transport in the past
decreased from the previous forecast, in    tow years.
relation to blockchain opportunity,
finance, manufacturing, and distribution in    Impact: The potential of BaaS has already
particular saw the largest speeding growth   been recognized by some of the world's
decrease for 2020 in relation to pre-           largest software companies.
COVID-19 estimates.
                                               Drivers and Inhibitors Main 4.
Other industries will indirectly feel the
effects of a slowdown in blockchain            European blockchain services is by far the
investment, as the essence of what drives     largest technology group in terms of
blockchain in cooperation and collaboration   spending, accounting for 63% if the
across the value chain. If one part of the         market in 2018.
value chain is impacted, subsequent effects
can be felt across all value chain members. ©
2020 IDC #EUR145774020 7 FIGURE 4
European Forecast: COVID-19....

FIG. 6B

NEURAL NETWORK TRAINED USING ORDINAL LOSS FUNCTION

TECHNICAL FIELD

Summary

In one or more embodiments, a computer-implemented method can include receiving multiple samples, each sample a computer-processable data structure corresponding to a real-world object and including a data element indicating the sample's class, the class one of n predefined classes to which each sample is linked. The method can include feeding each sample to an ordinal mapping deep neural network that maps each sample to a sample point of a multidimensional space. The method can include predicting the class of each sample based on an ordinal mapping of each sample point by the ordinal mapping deep neural network. The method can include iteratively adjusting parameters of the ordinal mapping deep neural network in response to misclassifying one or more of the samples by the ordinal mapping deep neural network. The iteratively adjusting can be based on an expected ordinal mapping loss determined by an ordinal mapping loss function that measures (a) distances between a hyperplane extending through each sample point in the multidimensional space and each other sample point of a same class and (b) overlap between sample points of different classes.

In one or more embodiments, a system includes a processor configured to initiate operations. The operations can include receiving multiple samples, each sample a computer-processable data structure corresponding to a real-world object and including a data element indicating the sample's class, the class one of n predefined classes to which each sample is linked. The operations can include feeding each sample to an ordinal mapping deep neural network that maps each sample to a sample point of a multidimensional space. The operations can predict the class of each sample based on an ordinal mapping of each sample point by the ordinal mapping deep neural network. The operations can include iteratively adjusting parameters of the ordinal mapping deep neural network in response to misclassifying one or more of the samples by the ordinal mapping deep neural network. The iteratively adjusting can be based on an expected ordinal mapping loss determined by an ordinal mapping loss function that measures (a) distances between a hyperplane extending through each sample point in the multidimensional space and each other sample point of a same class and (b) overlap between sample points of different classes.

In one or more embodiments, a computer program product includes one or more computer readable storage media having instructions stored thereon. The instructions are executable by a processor to initiate operations. The operations can include receiving multiple samples, each sample a computer-processable data structure corresponding to a real-world object and including a data element indicating the sample's class, the class one of n predefined classes to which each sample is linked. The operations can include feeding each sample to an ordinal mapping deep neural network that maps each sample to a sample point of a multidimensional space. The operations can include predicting the class of each sample based on an ordinal mapping of each sample point by the ordinal mapping deep neural network. The operations can include iteratively adjusting parameters of the ordinal mapping deep neural network in response to misclassifying one or more of the samples by the ordinal mapping deep neural network. The iteratively adjusting can be based on an expected ordinal mapping loss determined by an ordinal mapping loss function that measures (a) distances between a hyperplane extending through each sample point in the multidimensional space and each other sample point of a same class and (b) overlap between sample points of different classes.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

FIG. 2 illustrates an example method of training the ordinal mapping deep neural network system of FIG. 1.

FIGS. 4A and 4B are example matrix transformations for determining an ordinal mapping loss.

FIGS. 6A and 6B illustrate example screen shots of a display generated with the computer system of FIG. 5.

DETAILED DESCRIPTION

Figure 1:
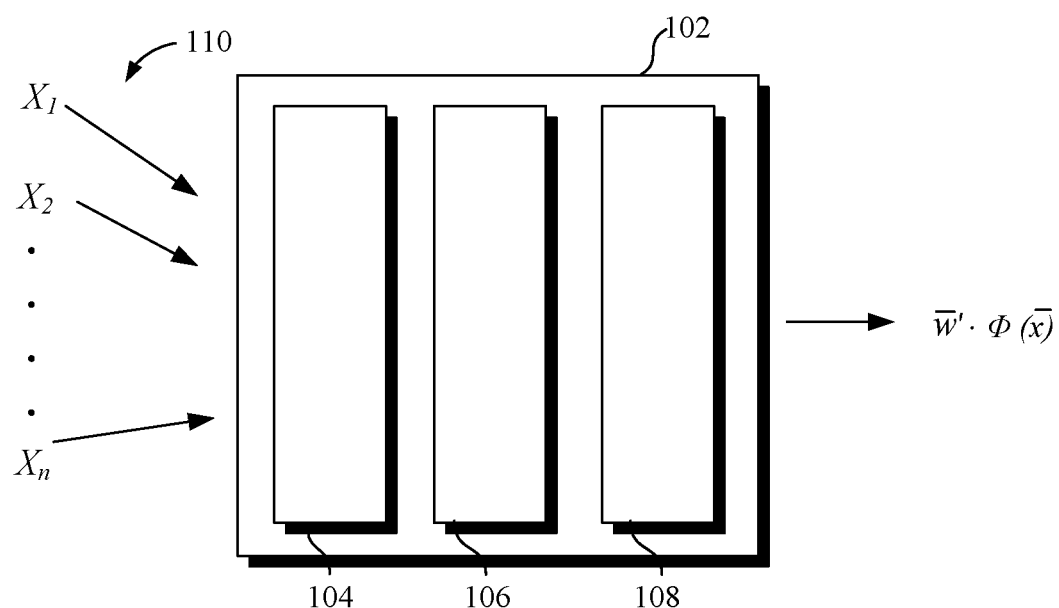
FIG. 1 illustrates an example ordinal mapping deep neural network system.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to training a neural network. As already noted, a neural network is a highly versatile vehicle for classifying samples of various kinds. The samples can be images, documents, or a host of other real-world objects that can be represented by feature vectors, the elements of which correspond to characteristics of the real-world objects. The feature vector elements of an image, for example, can correspond to the pixel data of the image. Each element of a feature vector corresponding to a document, for example, can correspond to a specific word of a predetermined vocabulary, the value of which indicates whether the word occurs in the document. Once trained and tested, a neural network can classify a sample of a real-world object (e.g., image, document) based on a feature vector whose elements characterize the real-world object.

Typically, the classification is a nominal classification. Some classification models generate a probability indicating the likelihood that a sample belongs to a category, the summation of the probabilities across every category summing to one. But a probability regarding the likely accuracy of a single classification does not provide an ordinal ranking among different classes. Some feedforward neural networks for multiclass classification problems have ordered classes but only one output unit, the values restricted to the unit interval [0, 1]. The interval must be subdivided into K subintervals (one for each class), according to a specific probabilistic model.

In accordance with the inventive arrangements described within this disclosure, example methods, systems, and computer program products are provided that are capable of training a neural network using an inventive ordinal mapping loss function. Algorithmically, neural networks are trained by minimizing the expected value of a loss function. The ordinal mapping loss function disclosed herein calculates, during model training, the model error upon completion of a feedforward cycle. An aspect of the inventive arrangements disclosed herein is that the ordinal mapping deep neural network is trained using the ordinal mapping loss function and provides a mapping to a one-dimensional space. The ordinal mapping deep neural network establishes an ordering and a distance metric that provides both a prediction of ordinal classes and rank ordering or ranking. The ordinal mapping deep neural network trained using the ordinal mapping loss function can provide an effective average of ranking of the ordinal classes.

One aspect of the ordinal mapping deep neural network trained using the ordinal mapping loss function is sample-to-sample pairwise comparisons. Based on the pairwise comparisons the ordinal mapping deep neural network maximizes distances between pairs of sample points (e.g., vectors) classified in different classes, the distance measured in a direction determined by the ordinal mapping deep neural network. At the same time sample points classified in the same classes are drawn closer thereby minimizing distances within each class. The process also provides the ordinal mapping deep neural network with "regularization." Regularization involves selecting or adjusting a neural network's complexity. Too many parameters make for poor generalization of the neural network due to overfitting. Too few jeopardizes the neural network's accuracy. The ordinal mapping deep neural network disclosed herein provides regularization that largely resolves the trade-off. By reducing the number of parameters (weights and biases) while preserving predictive accuracy, moreover, the ordinal mapping deep neural network also reduces transfers between memory and processor, lessening strain on both memory capacity and bandwidth thus further enhancing computation efficiency.

Other neural networks break classifying into multiple binary classifications, which typically cannot replicate an ordered metric (or estimated average ranking) without invoking a number of restrictive assumptions. These deep neural networks typically require piecing together multiple components. Unlike the ordinal mapping deep neural network trained using the ordinal mapping loss function disclosed herein, other deep neural networks must piece together multiple components and do not generate an optimized metric. The ordinal mapping deep neural network trained using the ordinal mapping loss function, as disclosed herein, does generate an optimized metric, an ordering and distance metric defined on a one-dimensional space.

In one arrangement, the ordinal mapping deep neural network is integrated within a system that scans documents and automatically extracts predetermined data points (e.g., statistics, factual assertions, predictions). The system enables a user to search, select, rate, and export to a device the data points, which the system pulls from various sources (e.g., publications, news feeds, websites). The ordinal mapping deep neural network provides a mapping of the data points to a one-dimensional space. Based on the mapping the data points can be ranked on a predetermined scale (e.g., −1 to 5). One aspect of the ranking using the ordinal mapping deep neural network is the generation of directed distances (part of the distance metric described above). Thus, for example, a sample point classified in class two and a sample point classified in class five not only differ by three units, but (as vectors) when projected on a number line (one-dimensional space), the mapping space value for the class five sample point also ranks three units greater than that of the class two sample point.

One of the advantages of the ordinal mapping deep neural network disclosed herein over approaches that pre-date the ordinal hyperplane loss (OHPL) approach, is the ordinal mapping deep neural network's enablement of direct estimation of ordered classes. As noted above, one earlier (pre-OHPL) approach necessitated changing the n-class prediction problem into multiple binary classifications. Another earlier approach required complex sampling, whereby a classification was treated as a complex binary problem. The ordinal mapping deep neural network's enablement of direct estimation of ordered classes disclosed herein overcomes these obstacles and limitations. With respect to OHPL, the ordinal mapping deep neural network disclosed herein is an advance over the OHPL approach, as well. Unlike the OHPL approach, the ordinal mapping deep neural network is not restricted by the need to calculate hyperplane centroids. The ordinal mapping loss function used in the ordinal mapping deep neural network employs a centroid-free loss function. As used herein, "centroid-free" means that a loss function defined as being centroid free does not use centroids in the calculation. Accordingly, using the centroid-free ordinal mapping loss function, the ordinal mapping deep neural network, unlike the OHPL approach, does not requiring calculating hyperplane centroids in the loss calculation for training the ordinal mapping deep neural network. Removal of hyperplane centroids from the calculation enables processing data in smaller batches. Using mini-batch processing (e.g., 64-512 records per mini-batch with shuffling), the ordinal mapping deep neural network can minimize computational cost, while ensuring that individual sample points (described below) are compared to as many points as possible within a full dataset. Accordingly, the ordinal mapping deep neural network is an improvement in computational efficiency over the OHPL approach as well as the pre-OHPL approach.

Another advantage of the ordinal mapping deep neural network is predictive accuracy. The ordinal mapping deep neural network has been shown to predict ordinal classifications better than those made using the OHPL approach. For example, in performing ordinal classifications of verbal statements according to predetermined criteria, while both achieved greater than 90 percent accuracy, OHPL never achieved better than 93 percent whereas the ordinal mapping deep neural network achieved a 95 percent accuracy.

Further aspects of the embodiments described within this disclosure are described in greater detail with reference to the figures below. For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

Figure 7:
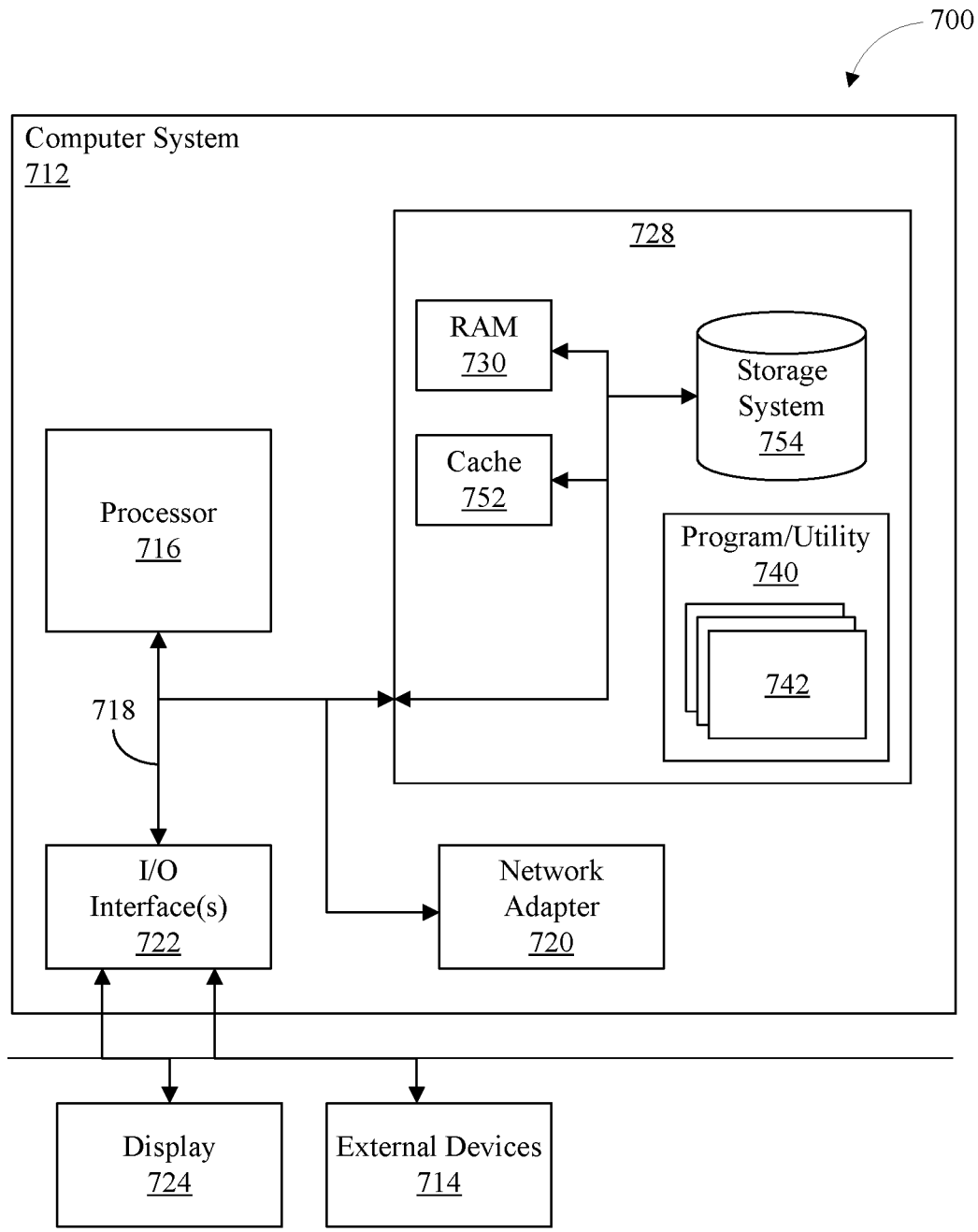
FIG. 7 illustrates an example a computing node.

FIGS. 1 and 2, respectively, illustrate example ordinal mapping system (system) 100 and example methodology 200 performed by system 100. System 100 illustratively includes ordinal mapping deep neural network (DNN 102). Ordinal mapping deep DNN 102 illustratively comprises an input layer 104 comprising one or more units (not explicitly shown) that each outputs the result of an operation that feeds into one or more units of the succeeding layer, one or more hidden layers 106 comprising one or more logically organized units (not explicitly shown) that each outputs the result of an operation that feeds into unit(s) of a succeeding layer, and output layer 108, also comprising one or more units (not explicitly shown) that outputs the result of the operations performed by each of the successive layers. In various embodiments, system 100 can be implemented in hardware (e.g., dedicated hardwired circuitry), software (e.g., program code executed by one or more processors), or a combination thereof. For example, system 100 in certain embodiments is implemented in a computing node, such as computing node 700 (e.g., cloud-based server), in which system 100 comprises program code that is electronically stored in a memory, such as memory 728, and executes on one or more processors, such as processor 716 of computer system 712 (FIG. 7).

At block 202, system 100 receives samples 110 (a set of labeled training examples) comprising training data for training ordinal mapping DNN 102. Each sample is a computer-processable data structure corresponding to a real-world object and includes a data element indicating the sample's class, the class being one of n predefined classes to which each sample is linked. The data structure can represent a vector, a matrix, or higher-order tensor, each element of which is a feature that characterizes the real-world object. For example, if the real-world object is text, then the sample may be an n-tuple, or vector, $\bar{x}$, in which each element indicates by a zero or one depending on whether the text includes a word from an n-word vocabulary. If the real-world object is an image, for example, then the sample may be a multi-dimensional tensor whose features correspond to the image's pixel representation.

Ordinal mapping DNN 102 is a classifier trained using supervised learning, and accordingly, each of the samples 110 are labeled with a target value. The target value of a sample indicates the correct class to which the sample belongs. During training, ordinal mapping DNN 102 predicts the class of a sample. Ordinal mapping DNN 102 misclassifies the sample if the predicted class differs from the sample's target value. For example, if the samples are text, the target value can correspond to how well the text supports a certain point of view, rank ordered on an arbitrary scale. Using samples thus labeled, ordinal mapping DNN 102 can learn to identify portions of text (e.g., sentences) that, based on their underlying features, would likely garner the same ranking. Similarly, if the samples are images, each image's target value can be a ranked response that the image elicited when viewed by a select group of viewers. Ordinal mapping DNN 102 accordingly can learn to recognize images and rank each image according to the reaction each is predicted to elicit. Learning by ordinal mapping DNN 102 entails generating a prediction for each of set of training samples and comparing the prediction for each sample with the target value of each sample.

Figure 3:
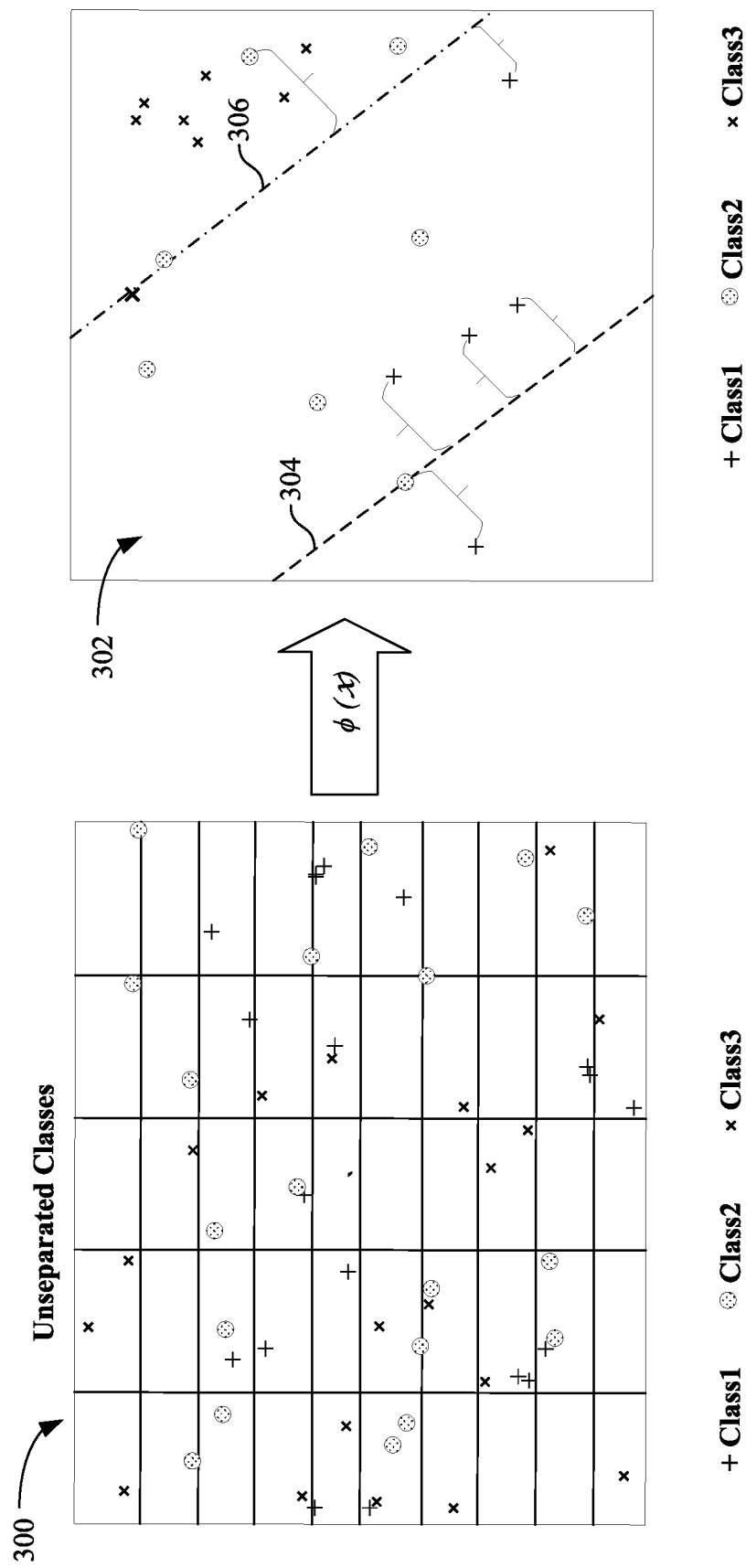
FIG. 3 illustrates an example ordinal mapping.

At block 204, each sample is fed into ordinal mapping DNN 102. Ordinal mapping DNN 102 maps each sample $\bar{x}$ (vector, matrix, or higher order tensor) to a sample point $\phi(\bar{x})$ in a multidimensional space $\mathbb{R}^n$, $\bar{x} \mapsto \phi(\bar{x}) \in \mathbb{R}^n$. FIG. 3 illustrates a mapping, $\phi$, that maps each sample $\bar{x}$ from space 300 to space 302 in $\mathbb{R}^2$. Ordinal mapping DNN 102 learns the mapping $\phi$ from the same or a comparable set of training samples. It is explicitly noted that although the two-dimensional space can be presented graphically for purpose of illustration, ordinal mapping DNN 102 can generate mappings to much higher-ordered multidimensional spaces $\mathbb{R}^n$. Illustratively, in FIG. 3 each of the samples corresponds to one of three classes. The data structure representation, as described above, includes a data element indicating each sample's class. Ordinal mapping DNN 102 illustratively maps the samples in a direction (from the origin) such that the sample points in $\mathbb{R}^2$, at least partially, are separated by class, the separation commensurate with each sample point's distance from the origin. The direction of separation, as generated by ordinal mapping DNN 102, extends outwardly in a direction of greatest separation of the samples by class.

At block 206, ordinal mapping DNN 102 predicts the class of each sample $\bar{x}$ based on an ordinal mapping of each sample point, $\phi(\bar{x}) \in \mathbb{R}^n$. The output of ordinal mapping DNN 102 is $\bar{w}' \cdot \phi(\bar{x})$, where $\bar{w}'$ is a transpose vector of $\bar{w}$, $\phi(\bar{x})$ is the mapping of sample $\bar{x}$ (also a vector) to a sample point in $\mathbb{R}^n$, and $\bar{w}' \cdot \phi(\bar{x})$ is the inner, or dot, product of the vectors. The scalar $\bar{w}' \cdot \phi(\bar{x})$ is the predicted value (ordinal class) generated by ordinal mapping DNN 102.

Illustratively in FIG. 3, hyperplanes 304 and 306 separate the classes, albeit not perfectly. Hyperplanes 304 and 306 are generalized representations of the sample points and chosen to be perpendicular to the direction of greatest separation. Hyperplanes 304 and 306 are determined by and correspond to classification parameters $\bar{w}$, which are determined by ordinal mapping DNN 102. The purpose of training ordinal mapping DNN 102 is to enhance the prediction accuracy of the output $\bar{w}' \cdot \phi(\bar{x})$.

At block 208 parameters w of ordinal mapping DNN 102 are iteratively adjusted in response to a misclassifying one or more of the samples by the ordinal mapping DNN 102. Ordinal mapping DNN 102 iteratively adjusts the parameters based on an expected loss determined by an ordinal mapping loss function in response to the misclassifying. The ordinal mapping loss function measures (a) distances between a hyperplane extending through each sample point in a class in the multidimensional space and each other sample point of the same class (within class differences) and (b) the overlap between sample points of different classes (between class differences).

The ordinal mapping loss can be computed using matrix algebra. A matrix Z is based on the $\bar{w}' \cdot \phi(\bar{x})$ outputs of the ordinal mapping DNN 102 (predicted class of each sample $\bar{x}$), and a matrix C comprises the elements that are corresponding target values (the actual class of each sample $\bar{x}$). The matrix Z replicates each column vector of outputs $\bar{w}' \cdot \phi(\bar{x})$ to generate a square matrix. For example, for three predicted outputs $(\bar{w}' \cdot \phi(\bar{x})_1, \bar{w}' \cdot \phi(\bar{x})_2, \bar{w}' \cdot \phi(\bar{x})_3)^T = (z_1, z_2, z_3)^T$, $$Z = \begin{pmatrix} z_1 & z_1 & z_1 \\ z_2 & z_2 & z_2 \\ z_3 & z_3 & z_3 \end{pmatrix}$$

Accordingly, the transpose of the matrix Z is $$Z' = \begin{pmatrix} z_1 & z_1 & z_1 \\ z_2 & z_2 & z_2 \\ z_3 & z_3 & z_3 \end{pmatrix}^T = \begin{pmatrix} z_1 & z_1 & z_1 \\ z_2 & z_2 & z_2 \\ z_3 & z_3 & z_3 \end{pmatrix}$$

The matrix C replicates each column vector, whose i-th element, $c_i$, is the target value (class) of the i-th predicted value, $w' \cdot \phi(\overline{x})_i$, of the i-th sample $\overline{x}_i$ of a training set. Thus, C is also a square matrix. For example, given three predicted outputs $(w' \cdot \phi(\overline{x})_1, w' \cdot \phi(\overline{x})_2, \overline{w}' \cdot \phi(\overline{x})_3)^T = (z_1, z_2, z_3)^T$ the corresponding target values (actual classes) are the elements vector of the vector $(c_1, c_2, c_3)^T$. According, the matric C is $$C = \begin{pmatrix} c_1 & c_1 & c_1 \\ c_2 & c_2 & c_2 \\ c_3 & c_3 & c_3 \end{pmatrix}$$

The transpose of the matric C is $$C' = \begin{pmatrix} c_1 & c_1 & c_1 \\ c_2 & c_2 & c_2 \\ c_3 & c_3 & c_3 \end{pmatrix}^T = \begin{pmatrix} c_1 & c_1 & c_1 \\ c_2 & c_2 & c_2 \\ c_3 & c_3 & c_3 \end{pmatrix}$$

To compute between-class errors based on distances between each sample in the multidimensional space, the transpose matrix $Z^T$ is subtracted from the matrix Z, generating $$Z - Z' = \begin{pmatrix} z_1 - z_1 & z_1 - z_2 & z_1 - z_3 \\ z_2 - z_1 & z_2 - z_2 & z_2 - z_3 \\ z_3 - z_1 & z_3 - z_2 & z_3 - z_3 \end{pmatrix}$$

Each $z_i - z_j$, $i \neq j$, is a distance in the multidimensional space between different predictions of ordinal mapping DNN 102 (if i=j, then the distance is, of course, zero since the predictions are for the same sample). The difference between predicted values can be computed as the distance between hyperplanes through each sample point $z_i$ and $z_j$. If class $c_i$ (the target value (or actual class) corresponding to predicted class $z_i$) is different from class $c_j$ (the target value (or actual class) corresponding to predicted class $z_j$), then the pair of samples for which ordinal mapping DNN 102 generates predicted values $z_i$ and $z_j$ are from different classes.

Distinguishing different classes from the same classes, requires taking differences between the respective target values (actual classes) corresponding to each ordinal mapping DNN 102 prediction. The differences are the elements of transpose matrix $C^T$ subtracted from the matrix C, which yields $$C - C' = \begin{pmatrix} c_1 - c_1 & c_1 - c_2 & c_1 - c_3 \\ c_2 - c_1 & c_2 - c_2 & c_2 - c_3 \\ c_3 - c_1 & c_3 - c_2 & c_3 - c_3 \end{pmatrix}$$

Between-class errors are differences between predicted values $z_i - z_j$, $i \neq j$, from different classes that are less than the difference between the corresponding target values (actual classes) $(c_i - c_j)$. A difference $z_i - z_j$ between predicted classes that is less than the difference between the actual classes $(c_i - c_j)$, if different $(c_i \neq c_j)$, of two samples connotes an overlap between sample points from separate classes. That is, the ordinal mapping DNN 102 is not providing predictions that sufficiently distinguish between the different ordering of the classes. These give rise to between-class errors that are a component of the ordinal mapping loss. These errors are determined by performing matrix subtraction, subtracting (Z–Z') from (C–C'), and transforming the resulting matrix. To transform $(c_i - c_j) - (z_i - z_j)$, each matrix element in which $c_i - c_j$ is less than or equal to zero, $c_i - c_j \leq 0$, is replaced by zero. Each remaining element of (C–C')–(Z–Z') is replaced by Max $\{[(c_i - c_j) - (z_i - z_j)], 0\}$. The between-class ordinal mapping loss is the sum of each of the resulting non-zero terms of the transformed matrix. In certain embodiments, the sum includes only errors that are greater than a predetermined margin, such that the each remaining element of (C–C')–(Z–Z') is replaced by Max $\{[(c_i - c_j) - (z_i - z_j)] - $ margin, $0\}$.

The other component of the ordinal mapping loss is the in-class error. Whereas the between-class error tests the sufficiency of the separation between predictions for samples from different classes, the in-class error tests the closeness of predictions of samples in the same class. The matrix (C–C')–(Z–Z') is also transformed to determine in-class error. The matrix transformation applies with respect to every element belonging to the same class, $c_i = c_j$. To transform the matrix, each element for with $c_i = c_j$ is replaced by Max $\{[(z_i - z_j) - $ margin$], 0\}$. The margin typically is less than one. For example, in certain arrangements, the margin is 0.3. All remaining elements are replaced by zero. Each non-zero element that corresponds to too great a distance between two predictions from the same class gives rise to an in-class error. The in-class error is the sum each of the resulting non-zero terms of the transformed matrix. The ordinal mapping loss is the sum of both between-class and in-class errors. Although an example computation of ordinal mapping loss has been described without loss of generality in the context of only three predictions $(\overline{w}' \cdot \phi(\overline{x})_1, \overline{w}' \cdot \phi(\overline{x})_2, \overline{w}' \cdot \phi(\overline{x})_3)^T$ and three corresponding target values (actual classes) $(c_1, c_2, c_3)^T$, whose square matrices are each 3-by-3 matrices, it is expressly noted that in most applications the predictions and corresponding target values will be much greater (e.g., a thousand or more).

Figure 4A:
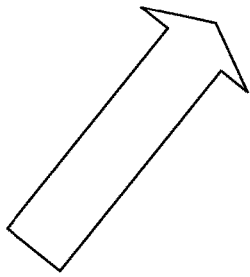

FIG. 4A is a numerical example of a transformed matrix resulting from the described process based on a limited number of samples $w' \cdot \phi(\overline{x})_i = z_i$, i=1, 2, 3, 4, 5, 6, 7 (seven samples) for which there are five classes, $c \in \{0, 1, 2, 3, 4\}$. The transformed matrix of FIG. 4A is obtained by creating a square matrix for the class differences, C–C', subtracting the square matrix created from differences between corresponding predicted values, Z–Z', and modifying each element according to the above-described process for determining between-class errors. The non-zero elements of the transformed matrix of FIG. 4A correspond to elements in which between-class differences are less than the actual class differences—that is, there is overlap indicating insufficient separation. The ordinal mapping loss due to between-class error is the sum of the non-zero elements.

FIG. 4B is an example transformed matrix for determining in-class error for the same training set of outputs $\overline{w}' \cdot \phi(\overline{x})_i$, i=1, 2, 3, 4, 5, 6, 7 (seven samples) for a five-class model, $c \in \{0, 1, 2, 3, 4\}$. The transformed matrix of FIG. 4B is obtained by creating the square matrix for the class differences, C–C', subtracting the square matrix created from differences between corresponding predicted values, Z–Z', and modifying each according to the above-described process for determining in-class errors. The non-zero elements of the transformed matrix of FIG. 4B correspond to elements in which in-class differences (elements in which $c_i = c_j$) are greater than a predetermined margin (e.g., 0.3). In-class differences greater than the predetermined margin correspond to too great a difference between predictions belonging to the same class. The ordinal mapping loss due to in-class error is the sum of the non-zero elements. The ordinal mapping loss is the sum of the between-class and in-class errors (16.4+4.7=21.1).

Based on the ordinal mapping loss, ordinal mapping DNN 102 iteratively adjusts the parameters by incrementally changing each parameter in a direction that generates two changes. One change tends to minimize, with respect to each sample, the distances between a hyperplane (perpendicular to the direction of separation) extending through the sample in the multidimensional space and each other sample of a same class. The other change tends to minimize overlap between samples of different classes, or equivalently, tends to maximize distances between samples in different classes.

Once trained, ordinal mapping DNN 102 can generate an ordering and distance metric that not only predicts the ordinal classes of newly presented sample, but also provides a one-dimensional mapping that generates an average ranking. Ordinal mapping DNN 102 can rank each newly presented sample's data structure (e.g., representing a vector, matrix, or higher order tensor) by mapping each data structure to a one-dimensional space having a defined ordering and distance metric. An ordinal mapping or ranking differs, say, from a confidence score that only provides a measure of statistical confidence that a classification is accurate. The confidence indicates that one classification is more likely correct than another, but it does not provide comparative information that on classification ranks, relative to some scale, higher than another. Similarly, for example, a score based on the number of keywords that appear in a document does not rank one document relative to another beyond the number of keywords occurring or number of times a keyword occurs in the respective documents. The score does not indicate that one document ranks higher relative to another, based for example on how well each document supports a particular point of view. Ordinal mapping DNN 102 is capable of providing such rankings.

Moreover, unlike other deep neural networks that provide an average ranking or rating, ordinal mapping DNN 102 trained using the optimal mapping loss function, does not require an enormous number of samples (e.g., millions in the context of survey responses) for learning to calculate the average ranking. Other deep neural networks break the problem into multiple binary problems and cannot replicate ordinal mapping DNN 102's ordered metric (estimated average), without invoking a number of additional restrictive assumptions, which require piecing together multiple components rather than generating an optimized metric.

Figure 5:
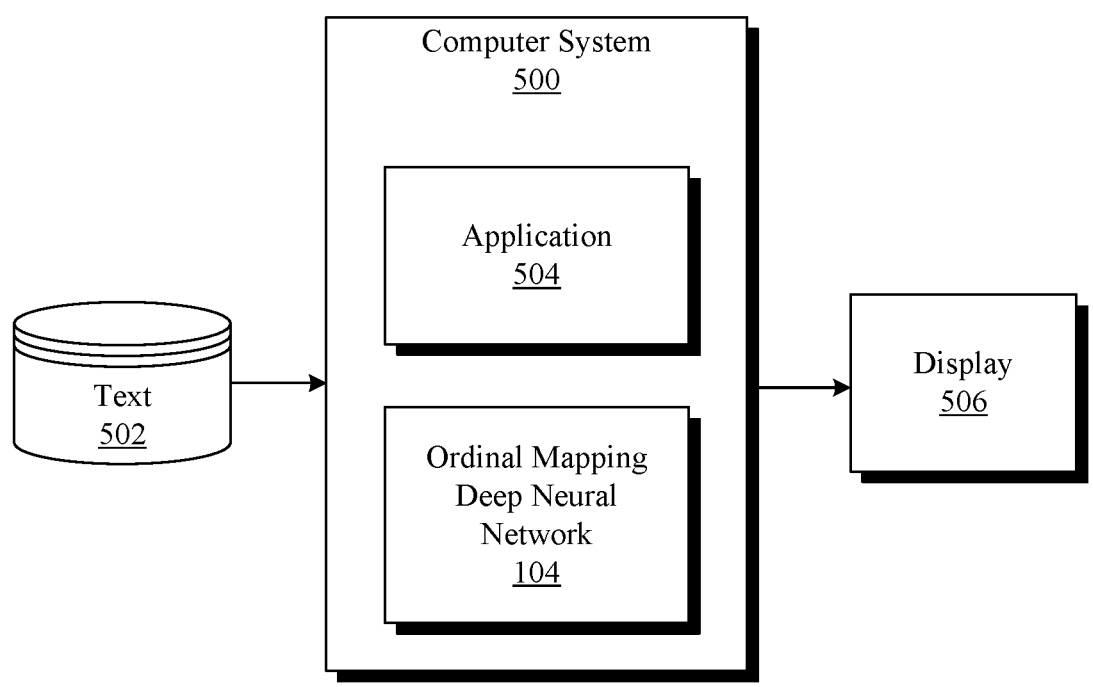
FIG. 5 illustrates an example computer system that uses an ordinal mapping deep neural network to rank items of text.

Ordinal mapping DNN 102, in certain arrangements, is capable of ranking factual statements identified in scanned-in text. Using the ordinal mapping loss function and a training set of ranked samples, ordinal mapping DNN 102 can learn to rank factual statements based on a predetermined scale that ranks factual statements according to how well each supports a predefined point of view. FIG. 5 illustrates example computer system 500 that receives text from database 502. The text can be received from various sources, such as web sites, news feeds, scanned-in or saved documents, and the like. Computer system 500 extracts from the text relevant portions (data points), such as statistics, facts and predictions generated by various sources using application 504. Application 504 enables users to search for, find, save, rate, and export highly rated portions of text from published reports, abstracts, professional reports, news feeds, and various websites that are submitted by multiple users. Based on training samples of text, ordinal mapping DNN 102 can generate ordinal rankings Once trained, ordinal mapping DNN 102 can rank text (or portions thereof) on an arbitrary scale (e.g., −1 to 5). With a scale, say, of −1 to 5, factual statements receiving a −1 rating are deemed worthless, unreadable, or otherwise unusable. Those receiving a 0 rating are readable, but do not represent items (e.g., fact, prediction, statistic, key quote) that support a predetermined point of view. Remaining items receive a ranking between 1 and 5. Those receiving a 5 are of the highest quality and thus, based on ordinal mapping DNN 102's ranking, likely to be highly useful to users.

In certain embodiments, computer system 500 applies ordinal mapping DNN 102 with respect to sentences that are extracted from text obtained from one or more sources identified as credible and that are useful in supporting a point of view. Such a sentence may contain a specific fact or statement that is supported by research, data and/or analytics. Such sentences can be qualitative in nature, but may typically be quantitative in nature, containing portions that reference percentages, time frames, currency, sizes, volumes, capacity amounts, or the like. An aspect of ordinal mapping DNN 102 a capability to link users directly to specific, highly rated sentences in documents or text rather than linking them solely to the text or document.

Rankings determined by ordinal mapping DNN 102 can enable a user to filter out all but text, including portions thereof or specific sentences, that receive ranking greater than a predetermined, user-specified threshold. A user is also able to add the user's own rankings to individual items, such that ordinal mapping DNN 102 can leverage newly added rankings to refine the predictions generated by ordinal mapping DNN 102.

FIG. 6A illustrates example screen presentation 600 of example sentences 602 and 604, which are extracted from credible text and provide quantitative data pertaining to the user-selected subject matter regarding the proliferation of blockchains. Sentences 602 and 604 are rendered by computer system 500 on display 506. Screen presentation 600 presents the factual statements (dealing with blockchains) that have been filtered in response to a user request to include only those receiving a rank generated by ordinal mapping DNN 102 that is 4 or greater on the predetermined scale from −1 to 5. The user request, in some arrangements, creates a link between at least one factual statement (e.g., sentence) and text that contains the at least one factual statement. The link can comprise a data structure that couples the factual statement with metadata indicating a computer storage location (e.g., database element), at which is electronically stored the text (e.g., document) from which the factual statement is extracted by application 504. Sentences 602 and 604 (factual statements) presented on display 506 are those identified as supporting a predetermined point of view (rapid growth in use of blockchains) and are ranked 4 or higher by ordinal mapping DNN 102.

FIG. 6B illustrates example screen presentation 606 which displays sentence 608 (factual statement regarding growth of blockchain use), which is shown in expanded form within the display of text 610 from which sentence 608 is extracted. Thus, computer system 500 is capable of showing a sentence (expanded or otherwise highlighted) that contains the factual statement within a display of the text from which the factual statement supporting a point of view is extracted. A user is able to download and read through text (e.g., news feed, article, report, or the like), within which computer system 500, based on a ranking provided by ordinal mapping DNN 102, visually distinguishes key elements (e.g., sentences) of the text. To visually highlight sentences or other key elements of the text based on the ranking provided by ordinal mapping DNN 102, computer system 500 can display portions of text (e.g., sentences or factual statement regarding a user-selected subject) in bold, color contrasted, enlarged, or otherwise distinguished from other portions of text. The sentence(s) or other key element(s) of the text can be ones that computer system 500 visually distinguishes in response to determining that the ordinal mapping DNN 102 ranking of the sentence(s) or other key element(s) exceeds a minimal threshold specified by the user. By the user selecting a sentence or factual statement having a ranking specified by the user (e.g., by hovering over a display of the sentence and selecting it using a pointer), computer system 500 can display a visually distinguished factual statement whose ranking indicates that the factual statement strongly supports a predetermined point of view.

In various other arrangements, ordinal mapping DNN 102 can be trained to rank order other types of newly presented samples. For example, presented with samples comprising a training set of labeled images, ordinal mapping DNN 102 can learn using the ordinal mapping loss function to rank order newly presented images. The ranking can correspond, for example, to the appeal (e.g., determined by a specific group of viewers) of each image. Using a computer system such as computer system 500 with display 506, one or more such images can be displayed by superimposing on each of the one or more images the ranking of each of the one or more images generated, the ranking according to a pre-defined criterion (e.g., interest or enjoyment likely generated in a viewer).

FIG. 7 illustrates a schematic of an example of a computing node 700. In one or more embodiments, computing node 700 is an example of a suitable cloud computing node. Computing node 700 is not intended to suggest any limitation as to the scope of use or functionality of embodiments of the invention described herein. Computing node 700 is capable of performing any of the functionality described within this disclosure.

Computing node 700 includes a computer system 712, which is operational with numerous other general-purpose or special-purpose computing system environments or configurations. Examples of well-known computing systems, environments, and/or configurations that may be suitable for use with computer system 712 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 712 may be described in the general context of computer system-executable instructions, such as program modules, being executed by a computer system. Generally, program modules may include routines, programs, objects, components, logic, data structures, and so on that perform particular tasks or implement particular abstract data types. Computer system 712 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system 712 is shown in the form of a general-purpose computing device. The components of computer system 712 may include, but are not limited to, one or more processors 716, a memory 728, and a bus 718 that couples various system components including memory 728 to processor 716. As defined herein, "processor" means at least one hardware circuit configured to carry out instructions. The hardware circuit may be an integrated circuit. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

The carrying out of instructions of a computer program by a processor comprises executing or running the program. As defined herein, "run" and "execute" comprise a series of actions or events performed by the processor in accordance with one or more machine-readable instructions. "Running" and "executing," as defined herein refer to the active performing of actions or events by the processor. The terms run, running, execute, and executing are used synonymously herein.

Bus 718 represents one or more of any of several types of bus structures, including a memory bus or memory controller, a peripheral bus, an accelerated graphics port, and a processor or local bus using any of a variety of bus architectures. By way of example only, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus, and PCI Express (PCIe) bus.

Computer system 712 typically includes a variety of computer system-readable media. Such media may be any available media that is accessible by computer system 712, and may include both volatile and non-volatile media, removable and non-removable media.

Memory 728 may include computer system readable media in the form of volatile memory, such as random-access memory (RAM) 730 and/or cache memory 732. Computer system 712 may further include other removable/non-removable, volatile/non-volatile computer system storage media. By way of example, storage system 734 can be provided for reading from and writing to a non-removable, non-volatile magnetic media and/or solid-state drive(s) (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 718 by one or more data media interfaces. As will be further depicted and described below, memory 728 may include at least one program product having a set (e.g., at least one) of program modules that are configured to carry out the functions of embodiments of the invention.

Program/utility 740, having a set (at least one) of program modules 742, may be stored in memory 728 by way of example, and not limitation, as well as an operating system, one or more application programs, other program modules, and program data. Each of the operating system, one or more application programs, other program modules, and program data or some combination thereof, may include an implementation of a networking environment. Program modules 742 generally carry out the functions and/or methodologies of embodiments of the invention as described herein. For example, one or more of the program modules may include an ECD system, such as ordinal mapping DNN system 100, or portions thereof.

Program/utility 740 is executable by processor 716. Program/utility 740 and any data items used, generated, and/or operated upon by computer system 712 are functional data structures that impart functionality when employed by computer system 712. As defined within this disclosure, a "data structure" is a physical implementation of a data model's organization of data within a physical memory. As such, a data structure is formed of specific electrical or magnetic structural elements in a memory. A data structure imposes physical organization on the data stored in the memory as used by an application program executed using a processor.

Computer system 712 may also communicate with one or more external devices 714 such as a keyboard, a pointing device, a display 724, etc.; one or more devices that enable a user to interact with computer system 712; and/or any devices (e.g., network card, modem, etc.) that enable computer system 712 to communicate with one or more other computing devices. Such communication can occur via input/output (I/O) interfaces 722. Still, computer system 712 can communicate with one or more networks such as a LAN, a WAN, and/or a public network (e.g., the Internet) via network adapter 720. Computer system 712 also can communicate with other devices via a wireless communication subsystem integrated in computing node 7 100 or operating as a type of external device 714 operatively coupled with computer system 712. The wireless communication subsystem can be designed to operate over one or more mobile networks, Wi-Fi networks, short range wireless networks (e.g., a Bluetooth, UWB), and/or any combination of the foregoing.

As depicted, network adapter 720 communicates with the other components of computer system 712 via bus 718. It should be understood that although not shown, other hardware and/or software components could be used in conjunction with computer system 712. Examples, include, but are not limited to: microcode, device drivers, redundant processing units, external disk drive arrays, RAID systems, tape drives, and data archival storage systems, etc.

While computing node 700 is used to illustrate an example of a computing node, such as a cloud computing node, it should be appreciated that a computer system using an architecture the same as or similar to that described in connection with FIG. 7 may be used in either cloud or non-cloud computing implementations in performing the various operations described herein. In this regard, the example embodiments described herein are not intended to be limited to any single type of computing environment. Computing node 700 is an example of a data processing system. As defined herein, "data processing system" means one or more hardware systems configured to process data, each hardware system including at least one processor programmed to initiate operations and memory.

Computing node 700 is an example of computer hardware. Computing node 700 may include fewer components than shown or additional components not illustrated in FIG. 7 depending upon the particular type of device and/or system that is implemented. The particular operating system and/or application(s) included may vary according to device and/or system type as may the types of I/O devices included. Further, one or more of the illustrative components may be incorporated into, or otherwise form a portion of, another component. For example, a processor may include at least some memory.

Computing node 700 is also an example of a server (e.g., cloud-based server). As defined herein, "server" means a data processing system configured to share services with one or more other data processing systems and/or devices, including client devices. As defined herein, "client device" means a data processing system that requests shared services from a server, and with which a user directly interacts. Examples of a client device include, but are not limited to, a workstation, a desktop computer, a computer terminal, a mobile computer, a laptop computer, a netbook computer, a tablet computer, a smart phone, and the like. In one or more embodiments, the various user devices described herein may be client devices. Network infrastructure, such as routers, firewalls, switches, access points and the like, are not client devices as the term "client device" is defined herein.

It is expressly noted that although this disclosure includes a detailed description on cloud computing, implementations of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 8:
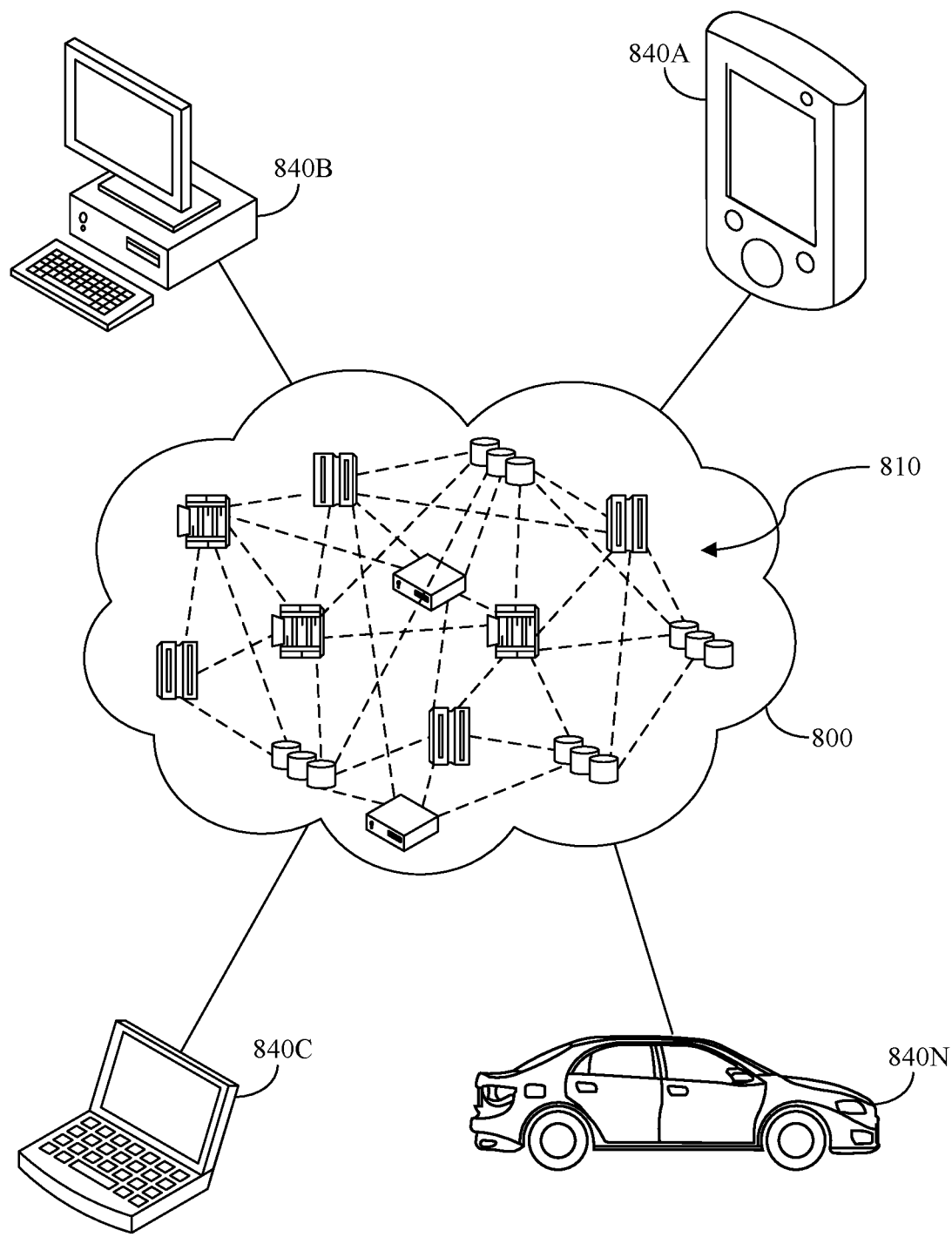
FIG. 8 illustrates an example cloud computing environment.

Referring now to FIG. 8, illustrative cloud computing environment 800 is depicted. As shown, cloud computing environment 800 includes one or more cloud computing nodes 810 with which local computing devices used by cloud consumers, such as, for example, personal digital assistant (PDA) or cellular telephone 840a, desktop computer 840b, laptop computer 840c, and/or automobile computer system 840n may communicate. Computing nodes 810 may communicate with one another. They may be grouped (not shown) physically or virtually, in one or more networks, such as Private, Community, Public, or Hybrid clouds as described hereinabove, or a combination thereof. This allows cloud computing environment 800 to offer infrastructure, platforms and/or software as services for which a cloud consumer does not need to maintain resources on a local computing device. It is understood that the types of computing devices 840a-n shown in FIG. 8 are intended to be illustrative only and that computing nodes 810 and cloud computing environment 800 can communicate with any type of computerized device over any type of network and/or network addressable connection (e.g., using a web browser).

Figure 9:
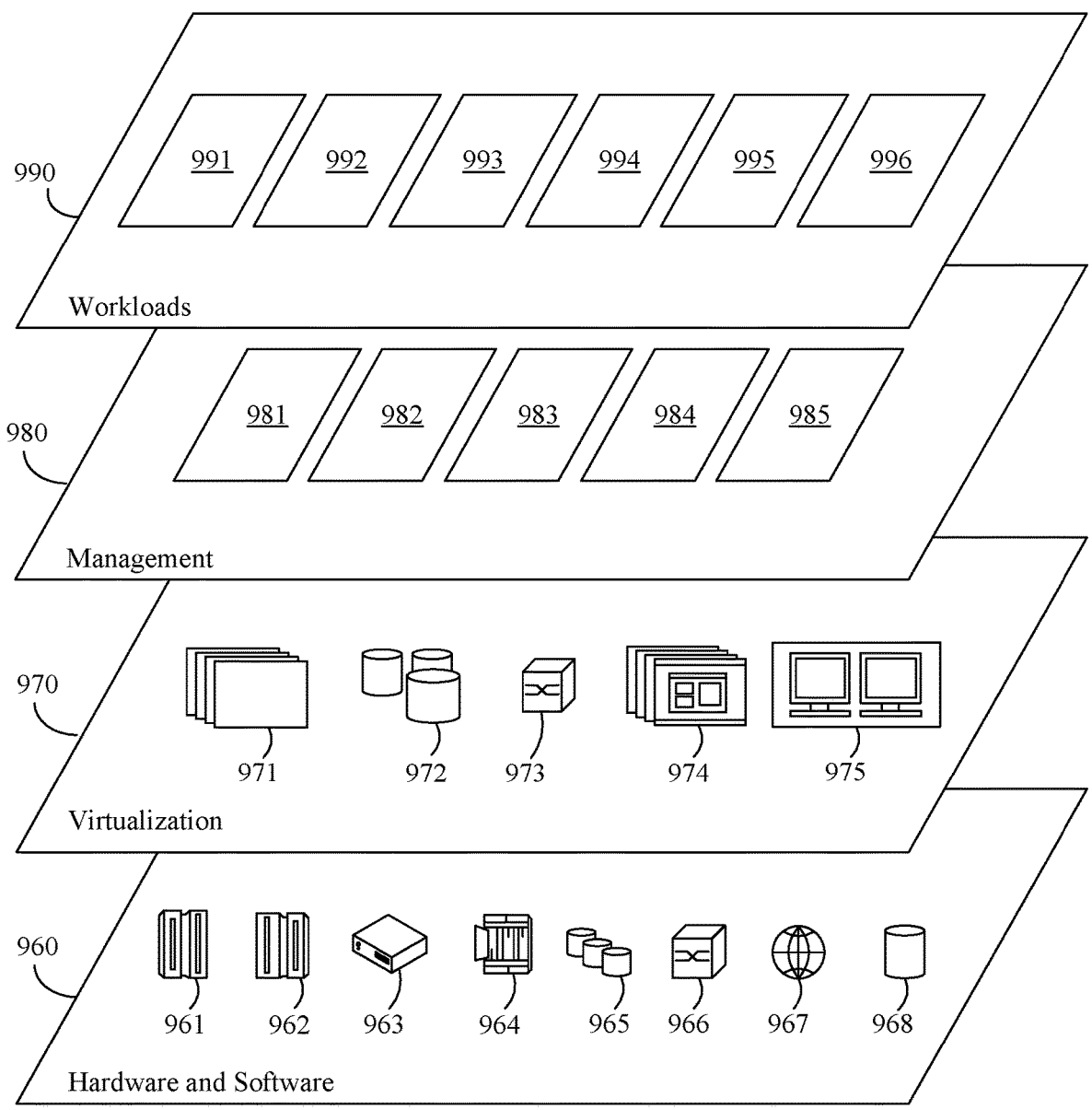
FIG. 9 illustrates example abstraction model layers.

Referring now to FIG. 9, a set of functional abstraction layers provided by cloud computing environment 800 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 960 includes hardware and software components. Examples of hardware components include mainframes 961; RISC (Reduced Instruction Set Computer) architecture-based servers 962; servers 963; blade servers 964; storage devices 965; and networks and networking components 966. In some embodiments, software components include network application server software 967 and database software 968.

Virtualization layer 970 provides an abstraction layer from which the following examples of virtual entities may be provided: virtual servers 971; virtual storage 972; virtual networks 973, including virtual private networks; virtual applications and operating systems 974; and virtual clients 975.

In one example, management layer 980 may provide the functions described below. Resource provisioning 981 provides dynamic procurement of computing resources and other resources that are utilized to perform tasks within the cloud computing environment. Metering and Pricing 982 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 983 provides access to the cloud computing environment for consumers and system administrators. Service level management 984 provides cloud computing resource allocation and management such that required service levels are met. Service Level Agreement (SLA) planning and fulfillment 985 provide pre-arrangement for, and procurement of, cloud computing resources for which a future requirement is anticipated in accordance with an SLA.

Workloads layer 990 provides examples of functionality for which the cloud computing environment may be utilized. Examples of workloads and functions which may be provided from this layer include: mapping and navigation 991; software development and lifecycle management 992; virtual classroom education delivery 993; data analytics processing 994; transaction processing 995; and ordinal mapping DNN system 996.

The terminology used herein is for the purpose of describing particular embodiments only and is not intended to be limiting. Notwithstanding, several definitions that apply throughout this document now will be presented.

As defined herein, the singular forms "a," "an," and "the" include the plural forms as well, unless the context clearly indicates otherwise.

As defined herein, "another" means at least a second or more.

As defined herein, "at least one," "one or more," and "and/or," are open-ended expressions that are both conjunctive and disjunctive in operation unless explicitly stated otherwise. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, "automatically" means without user intervention.

As defined herein, "includes," "including," "comprises," and/or "comprising," specify the presence of stated features, integers, steps, operations, elements, and/or components, but do not preclude the presence or addition of one or more other features, integers, steps, operations, elements, components, and/or groups thereof.

As defined herein, "if" means "in response to" or "responsive to," depending upon the context. Thus, the phrase "if it is determined" may be construed to mean "in response to determining" or "responsive to determining" depending on the context. Likewise, the phrase "if [a stated condition or event] is detected" may be construed to mean "upon detecting [the stated condition or event]" or "in response to detecting [the stated condition or event]" or "responsive to detecting [the stated condition or event]" depending on the context.

As defined herein, "one embodiment," "an embodiment," "in one or more embodiments," "in particular embodiments," or similar language mean that a particular feature, structure, or characteristic described in connection with the embodiment is included in at least one embodiment described within this disclosure. Thus, appearances of the aforementioned phrases and/or similar language throughout this disclosure may, but do not necessarily, all refer to the same embodiment.

As defined herein, the phrases "in response to" and "responsive to" mean responding or reacting readily to an action or event. Thus, if a second action is performed "in response to" or "responsive to" a first action, there is a causal relationship between an occurrence of the first action and an occurrence of the second action. The phrases "in response to" and "responsive to" indicate the causal relationship.

As defined herein, "real-time" means a level of processing responsiveness that a user or system senses as sufficiently immediate for a particular process or determination to be made, or that enables the processor to keep up with some external process.

As defined herein, "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

As defined herein, "user," "decision maker," "candidate," "individual," and "member" each refer to a human being.

The terms first, second, etc. may be used herein to describe various elements. These elements should not be limited by these terms, as these terms are only used to distinguish one element from another unless stated otherwise or the context clearly indicates otherwise.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration and are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented process for training an ordinal mapping deep neural network, the computer-implemented process comprising:

receiving a plurality of samples, wherein each sample is a computer-processable data structure corresponding to a real-world object and includes a data element indicating a class of each sample, wherein the class is one of n predefined classes to which each sample is linked;

feeding each sample into an ordinal mapping deep neural network that maps each sample to a sample point of a multidimensional space,
  wherein a sample, of the plurality of samples, comprises factual statements identified within text, and
  wherein the ordinal mapping deep neural network ranks the factual statements identified within the text;

predicting the class based on an ordinal mapping of each sample point by the ordinal mapping deep neural network; and iteratively adjusting parameters of the ordinal mapping deep neural network in response to misclassifying one or more samples, of the plurality of samples, by the ordinal mapping deep neural network, wherein the iteratively adjusting is based on an expected ordinal mapping loss determined by an ordinal mapping loss function that measures (a) distances between a hyperplane extending through each sample point in the multidimensional space and each other sample point of a same class and (b) overlap between sample points of different classes.

2. The computer-implemented process of claim 1, wherein the iteratively adjusting comprises:

minimizing for each sample distances between a hyperplane extending through the sample in the multidimensional space and each other sample of the same class; and minimizing the overlap between samples of different classes.

3. The computer-implemented process of claim 2, wherein
  the ordinal mapping deep neural network ranks newly input samples by mapping a data structure for each sample to a one-dimensional space having a defined ordering and distance metric.

4. The computer-implemented process of claim 1, wherein
  a predetermined scale ranks factual statements according to how well each factual statement supports a predefined point of view.

5. The computer-implemented process of claim 1, comprising:

conveying to a computer-based system one or more factual statements and generating a ranking of each of the one or more factual statements; and presenting the one or more factual statements and ranking of each of the one or more factual statements to a user on a display of a user device.

6. The computer-implemented process of claim 5, comprising:

in response to a user request, creating a link between at least one factual statement and text that contains the at least one factual statement.

7. The computer-implemented process of claim 6, comprising:

displaying the at least one factual statement juxtaposed inside a display of the text that contains the at least one factual statement.

8. The computer-implemented process of claim 1, wherein
  the samples comprise images and, once trained, the ordinal mapping deep neural network ranks the images, the rankings based on a predetermined scale that ranks images according to a predefined criterion.

9. The computer-implemented process of claim 8, comprising:
conveying to a computer-based system for displaying one or more images and associating the ranking of each of the one or more images with displays of the one or more images.

10. A system, comprising:
a processor configured to initiate operations including:
receiving a plurality of samples, wherein each sample is a computer-processable data structure corresponding to a real-world object and includes a data element indicating a class of each sample, wherein the class is one of n predefined classes to which each sample is linked;
feeding each sample into an ordinal mapping deep neural network that maps each sample to a sample point of a multidimensional space,
wherein a sample, of the plurality of samples, comprises factual statements identified within text, and
wherein the ordinal mapping deep neural network ranks the factual statements identified within the text;
predicting the class based on an ordinal mapping of each sample point by the ordinal mapping deep neural network; and
iteratively adjusting parameters of the ordinal mapping deep neural network in response to misclassifying one or more of the samples by the ordinal mapping deep neural network, wherein the iteratively adjusting is based on an expected ordinal mapping loss determined by an ordinal mapping loss function that measures (a) distances between a hyperplane extending through each sample point in the multidimensional space and each other sample point of a same class and (b) overlap between sample points of different classes.

11. The system of claim 10, wherein the iteratively adjusting includes:
minimizing for each sample the distances between a hyperplane extending through the sample in the multidimensional space and each other sample of a same class; and
minimizing the overlap between samples of different classes.

12. The system of claim 10, wherein
the ordinal mapping deep neural network ranks newly input samples by mapping a data structure of each sample to a one-dimensional space having a defined ordering and distance metric.

13. The system of claim 10, wherein
wherein a predetermined scale ranks factual statements according to how well each factual statement supports a predefined point of view.

14. The system of claim 13, wherein the processor is configured to initiate operations further including:
conveying to a computer-based system one or more factual statements and generating a ranking of each of the one or more factual statements; and
presenting the one or more factual statements and ranking of each of the one or more factual statements to a user on a display of a user device.

15. The system of claim 14, wherein the processor is configured to initiate operations further including:
in response to a user request, creating a link between at least one factual statement and text that contains the at least one factual statement.

16. The system of claim 15, wherein the processor is configured to initiate operations further including:
displaying the at least one factual statement juxtaposed inside a display of the text that contains the at least one factual statement.

17. The system of claim 10, wherein
the samples comprise images and, once trained, the ordinal mapping deep neural network ranks the images, the rankings based on a predetermined scale that ranks images according to a predefined criterion.

18. The system of claim 17, wherein the processor is configured to initiate operations further including:
conveying to a computer-based system for displaying one or more images and associating the ranking of each of the one or more images with displays of the one or more images.

19. A computer program product, the computer program product comprising:
one or more computer-readable storage media and program instructions collectively stored on the one or more computer-readable storage media, the program instructions executable by a processor to cause the processor to initiate operations including:
receiving a plurality of samples, wherein each sample is a computer-processable data structure corresponding to a real-world object and includes a data element indicating a class of each sample, wherein the class is one of n predefined classes to which each sample is linked;
feeding each sample into an ordinal mapping deep neural network that maps each sample to a sample point of a multidimensional space,
wherein a sample, of the plurality of samples, comprises factual statements identified within text, and
wherein the ordinal mapping deep neural network ranks the factual statements identified within the text;
predicting the class based on an ordinal mapping of each sample point by the ordinal mapping deep neural network; and
iteratively adjusting parameters of the ordinal mapping deep neural network in response to misclassifying one or more of the samples by the ordinal mapping deep neural network, wherein the iteratively adjusting is based on an expected ordinal mapping loss determined by an ordinal mapping loss function that measures (a) distances between a hyperplane extending through each sample point in the multidimensional space and each other sample point of a same class and (b) overlap between sample points of different classes.

20. The computer program product of claim 19, wherein the program instructions are executable by the processor to cause the processor to initiate operations further including:
minimizing for each sample the distances between a hyperplane extending through the sample point in the multidimensional space and each other sample of a same class; and
minimizing the overlap between samples of different classes.

* * * * *